(12) United States Patent
Ashton et al.

(10) Patent No.: US 11,054,846 B2
(45) Date of Patent: *Jul. 6, 2021

(54) AIRFLOW BALANCING VALVE FOR HVAC SYSTEMS

(71) Applicant: MI VALVE, LLC, Clearwater, FL (US)

(72) Inventors: James P. Ashton, Burnsville, NC (US); Scott D. Madden, St. Petersburg, FL (US)

(73) Assignee: MI VALVE, LLC, Clearwater, FL (US)

( * ) Notice: Subject to any disclaimer, the term of this patent is extended or adjusted under 35 U.S.C. 154(b) by 225 days.

This patent is subject to a terminal disclaimer.

(21) Appl. No.: 16/233,547

(22) Filed: Dec. 27, 2018

(65) Prior Publication Data

US 2019/0129451 A1  May 2, 2019

Related U.S. Application Data

(63) Continuation of application No. 14/635,317, filed on Mar. 2, 2015, now Pat. No. 10,203,703.

(60) Provisional application No. 61/947,569, filed on Mar. 4, 2014.

(51) Int. Cl.
*G05D 7/01* (2006.01)
*F24F 13/14* (2006.01)
*F24F 11/75* (2018.01)

(52) U.S. Cl.
CPC .......... *G05D 7/0173* (2013.01); *F24F 11/75* (2018.01); *F24F 13/1426* (2013.01)

(58) Field of Classification Search
CPC .................................... G05D 1/0173
USPC ........................................................ 454/256
See application file for complete search history.

(56) References Cited

U.S. PATENT DOCUMENTS

| 95,967 | A | 10/1869 | Baker |
| 387,215 | A | 8/1888 | Doane, Jr. |
| 1,165,115 | A | 12/1915 | Nelson |
| 1,393,204 | A | 10/1921 | Daggett |

(Continued)

FOREIGN PATENT DOCUMENTS

| DE | 102010038150 A1 | 2/2012 |
| EP | 1111314 A1 | 6/2001 |

(Continued)

OTHER PUBLICATIONS

American Aldes, "Constant Airflow Regulators CAR-II" 2014, pp. 1-8.

(Continued)

*Primary Examiner* — Avinash A Savani
*Assistant Examiner* — Frances F. Hamilton
(74) *Attorney, Agent, or Firm* — Banner & Witcoff, Ltd.

(57) ABSTRACT

An automatic airflow balancing valve (10), including: a housing (12) having an inlet (14) and an outlet (16) and defining a flow path (18) there through; a valve disc (30) operatively connected to the housing and disposed within the flow path; and an airflow volume calibrating assembly (92) disposed in the flow path and operatively connected to the valve disc and the housing to pivot the valve disc to a home position associated with a desired constant airflow volume. The airflow volume calibrating assembly includes an adjustment element that extends toward at least one of the inlet or the outlet.

36 Claims, 10 Drawing Sheets

(56) References Cited

U.S. PATENT DOCUMENTS

| | | | | |
|---|---|---|---|---|
| 2,056,410 | A | 10/1936 | Schaaf | |
| 2,123,998 | A | 7/1938 | Koch | |
| 2,169,168 | A * | 8/1939 | Shipley | F23N 3/085 236/9 R |
| 2,230,882 | A | 2/1941 | Cameron | |
| 2,345,997 | A | 4/1944 | Anderson | |
| 2,349,727 | A * | 5/1944 | Hopkins | F16K 1/221 137/552 |
| 2,358,260 | A | 9/1944 | Simpson | |
| 2,665,873 | A | 1/1954 | Backman et al. | |
| 3,034,531 | A | 5/1962 | Kennedy | |
| 3,070,345 | A * | 12/1962 | Knecht | F16K 15/035 251/212 |
| 3,086,407 | A | 4/1963 | Reece | |
| 3,183,930 | A | 5/1965 | Herschel | |
| 3,204,664 | A | 9/1965 | Gorchev et al. | |
| 3,311,302 | A | 3/1967 | Merckle | |
| 3,452,762 | A | 7/1969 | Fahre | |
| 3,506,038 | A | 4/1970 | Perry et al. | |
| 3,538,945 | A | 11/1970 | Dean, Jr. | |
| 3,791,281 | A * | 2/1974 | Steiner | F24F 7/013 454/350 |
| 3,840,042 | A | 10/1974 | Brundage | |
| 3,942,552 | A | 3/1976 | Logsdon | |
| 3,958,605 | A | 5/1976 | Nishizu et al. | |
| 3,993,096 | A * | 11/1976 | Wilson | F16K 1/16 137/599.18 |
| 3,994,434 | A | 11/1976 | Boyer et al. | |
| 4,026,321 | A | 5/1977 | Kahoe et al. | |
| 4,088,150 | A | 5/1978 | Serratto | |
| 4,176,690 | A | 12/1979 | Clark et al. | |
| 4,506,830 | A * | 3/1985 | Francel | F24F 11/74 236/49.4 |
| 4,523,609 | A | 6/1985 | Weck | |
| 4,557,183 | A * | 12/1985 | Kolt | F24F 13/1426 251/297 |
| 4,570,901 | A | 2/1986 | Holtgraver | |
| 4,633,900 | A | 1/1987 | Suzuki | |
| 4,674,531 | A | 6/1987 | Aalto et al. | |
| 4,691,689 | A | 9/1987 | Shepherd et al. | |
| 4,697,607 | A * | 10/1987 | Aalto | F24F 13/1413 137/1 |
| 4,739,924 | A | 4/1988 | Kelley | |
| 5,141,018 | A * | 8/1992 | Guterman | F16K 5/0657 137/375 |
| 5,169,121 | A | 12/1992 | Blanco et al. | |
| 5,398,728 | A | 3/1995 | Baumeister et al. | |
| 5,819,791 | A * | 10/1998 | Chronister | F16K 15/038 137/512.1 |
| 5,979,872 | A | 11/1999 | Stearns et al. | |
| 6,003,554 | A * | 12/1999 | Magdelyns | F02D 9/101 123/337 |
| 6,009,894 | A | 1/2000 | Trussart | |
| 6,012,483 | A * | 1/2000 | Beddies | G01F 1/11 137/512.1 |
| 6,082,704 | A * | 7/2000 | Grinbergs | F24F 13/1486 251/306 |
| 6,116,375 | A | 9/2000 | Lorch et al. | |
| 6,192,922 | B1 * | 2/2001 | MacGibbon | F16K 3/085 137/486 |
| 6,198,243 | B1 | 3/2001 | Ritmanich et al. | |
| 6,240,735 | B1 | 6/2001 | Kolson et al. | |
| 6,457,437 | B1 | 10/2002 | Frasier et al. | |
| 6,698,445 | B2 | 3/2004 | Zelczer | |
| 6,959,909 | B2 * | 11/2005 | Bancroft | F16K 31/602 137/385 |
| 7,140,593 | B2 | 11/2006 | Pearson et al. | |
| 7,188,481 | B2 | 3/2007 | DeYoe et al. | |
| 7,410,416 | B2 | 8/2008 | Fettkether | |
| 7,442,120 | B2 * | 10/2008 | Poirier | F16L 37/26 285/325 |
| 7,533,691 | B2 | 5/2009 | Marcoux et al. | |
| 7,582,009 | B1 | 9/2009 | Cote | |
| 7,766,734 | B2 | 8/2010 | Dietz et al. | |
| 7,967,669 | B2 | 6/2011 | Baik | |
| 8,038,075 | B1 | 10/2011 | Walsh | |
| 8,122,911 | B2 * | 2/2012 | Wark | G01F 1/42 138/45 |
| 8,251,088 | B2 * | 8/2012 | Wark | F23K 3/02 137/315.22 |
| 8,430,731 | B2 | 4/2013 | Bamberger | |
| 8,550,888 | B2 * | 10/2013 | Hildreth, Jr. | F24F 13/1426 454/273 |
| 8,651,452 | B2 | 2/2014 | Hemman et al. | |
| 8,740,187 | B2 * | 6/2014 | Barton | F16K 1/226 251/305 |
| 8,951,103 | B2 | 2/2015 | Votaw et al. | |
| 9,032,993 | B2 | 5/2015 | Barton et al. | |
| 9,334,972 | B2 | 5/2016 | Talawar et al. | |
| 9,383,117 | B2 * | 7/2016 | Labrecque | F24F 13/1426 |
| 9,568,207 | B2 | 2/2017 | Du et al. | |
| 9,732,980 | B2 | 8/2017 | Du et al. | |
| 9,777,942 | B2 | 10/2017 | Hill | |
| 9,835,354 | B2 | 12/2017 | Yoskowitz | |
| 9,845,965 | B2 | 12/2017 | Lehnert et al. | |
| 9,927,044 | B2 * | 3/2018 | Kezar | F16K 1/52 |
| 10,423,172 | B2 | 9/2019 | Niederhauser et al. | |
| 2003/0106592 | A1 * | 6/2003 | Zelczer | F15B 15/1428 137/601.13 |
| 2004/0169089 | A1 * | 9/2004 | Hunka | F24F 3/0442 236/1 B |
| 2004/0182449 | A1 * | 9/2004 | Schneider | F24F 13/1426 137/527 |
| 2006/0199525 | A1 * | 9/2006 | Marcoux | F24F 13/1426 454/277 |
| 2006/0214128 | A1 * | 9/2006 | Horner | F16K 27/0218 251/305 |
| 2008/0072973 | A1 | 3/2008 | McGonigle et al. | |
| 2008/0113613 | A1 | 5/2008 | Petrossian | |
| 2011/0100050 | A1 | 5/2011 | Mediato Martinez et al. | |
| 2011/0265466 | A1 * | 11/2011 | Ikeda | F16K 1/223 60/324 |
| 2012/0112108 | A1 * | 5/2012 | Barton | F16K 1/226 251/212 |
| 2012/0282853 | A1 | 11/2012 | Sinur et al. | |
| 2013/0333784 | A1 | 12/2013 | Marak et al. | |
| 2013/0337736 | A1 * | 12/2013 | Marak | F24F 13/1426 454/317 |
| 2014/0364052 | A1 | 12/2014 | Borander | |
| 2015/0019022 | A1 * | 1/2015 | Karamanos | G05D 7/0647 700/276 |
| 2015/0031280 | A1 | 1/2015 | Barbarin et al. | |
| 2015/0147955 | A1 | 5/2015 | Yoskowitz | |
| 2015/0159906 | A1 | 6/2015 | Jackson | |
| 2015/0168004 | A1 | 6/2015 | Emmons et al. | |
| 2015/0168006 | A1 | 6/2015 | Du et al. | |
| 2015/0168007 | A1 * | 6/2015 | Du | F24F 11/74 236/49.5 |
| 2015/0168985 | A1 | 6/2015 | Du et al. | |
| 2015/0204575 | A1 | 7/2015 | Kotlowski et al. | |
| 2015/0226448 | A1 | 8/2015 | Koop | |
| 2015/0253781 | A1 | 9/2015 | Ashton et al. | |
| 2015/0330661 | A1 | 11/2015 | Hill | |
| 2016/0032794 | A1 * | 2/2016 | Fischer | F02D 9/04 251/305 |
| 2017/0114907 | A1 * | 4/2017 | Colpan | F16K 1/221 |
| 2017/0176044 | A1 * | 6/2017 | Kezar | F16H 21/44 |
| 2017/0234574 | A1 | 8/2017 | Marak et al. | |
| 2019/0212023 | A1 | 7/2019 | Michaud et al. | |
| 2019/0376614 | A1 | 12/2019 | Carlson et al. | |
| 2019/0376707 | A1 | 12/2019 | Emmons et al. | |
| 2019/0376721 | A1 | 12/2019 | Carlson et al. | |
| 2020/0033022 | A1 | 1/2020 | Damizet et al. | |

FOREIGN PATENT DOCUMENTS

| | | | |
|---|---|---|---|
| WO | 0001991 | A1 | 1/2000 |
| WO | 2015028777 | A1 | 3/2015 |

(56) References Cited

FOREIGN PATENT DOCUMENTS

| WO | 2016153371 A1 | 9/2016 |
|---|---|---|
| WO | 2019184506 A1 | 10/2019 |

OTHER PUBLICATIONS

Fixduct, "Types of Constant Airflow Regulators Installed" 2012, pp. 1-6.
Reversomatic Manufacturing Limited, "Constant Air Volume Controller", 2014, pp. 104.
Hellotrade, "Fire Dampers Suppliers", 2013, pp. 1-7.
Rosemex Air Terminal Unit Mark Air Valves catalog; Jul. 23, 2012.
Phoenix Controls "Products" web page downloaded from Internet Archive; Feb. 23, 2014.
Troxusa, "Constant Flow", 2013, pp. 1-2.
Phoenix Controls product literature for Accel II® Airflow Control Valves; date of first publication unknown.
"How VAV Boxes Work/HVAC Zoning" highperformancehvac.com, Oct. 30, 2017, <https://highperformancehvac.com/how-do-vav-boxes-work-commercial-hvac-systems/>, 9 pages.
"CFSD-222-1-PB, 20x8," webrepswholesale.com (Accessed Nov. 16, 2020), <https://www.webrepswholesale.com/product/LLCFSD222-1PB20x8/contact.html#.X7N4ehNKhTY>, Lloyd Industries, 8 pages.
"FSD-211M" greenheck.com, Accessed Nov. 16, 2020, <https://www.greenheck.com/products/air-control/dampers/fsd-211m>, 2 pages.

\* cited by examiner

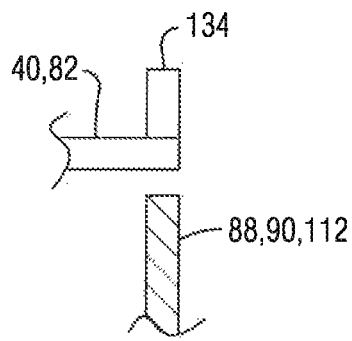
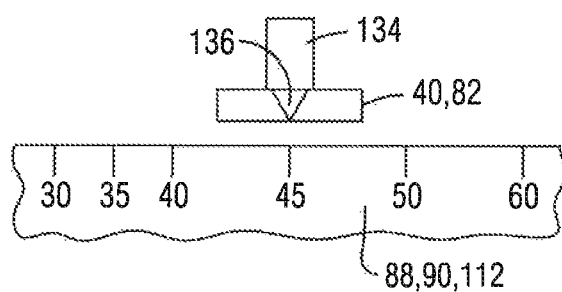
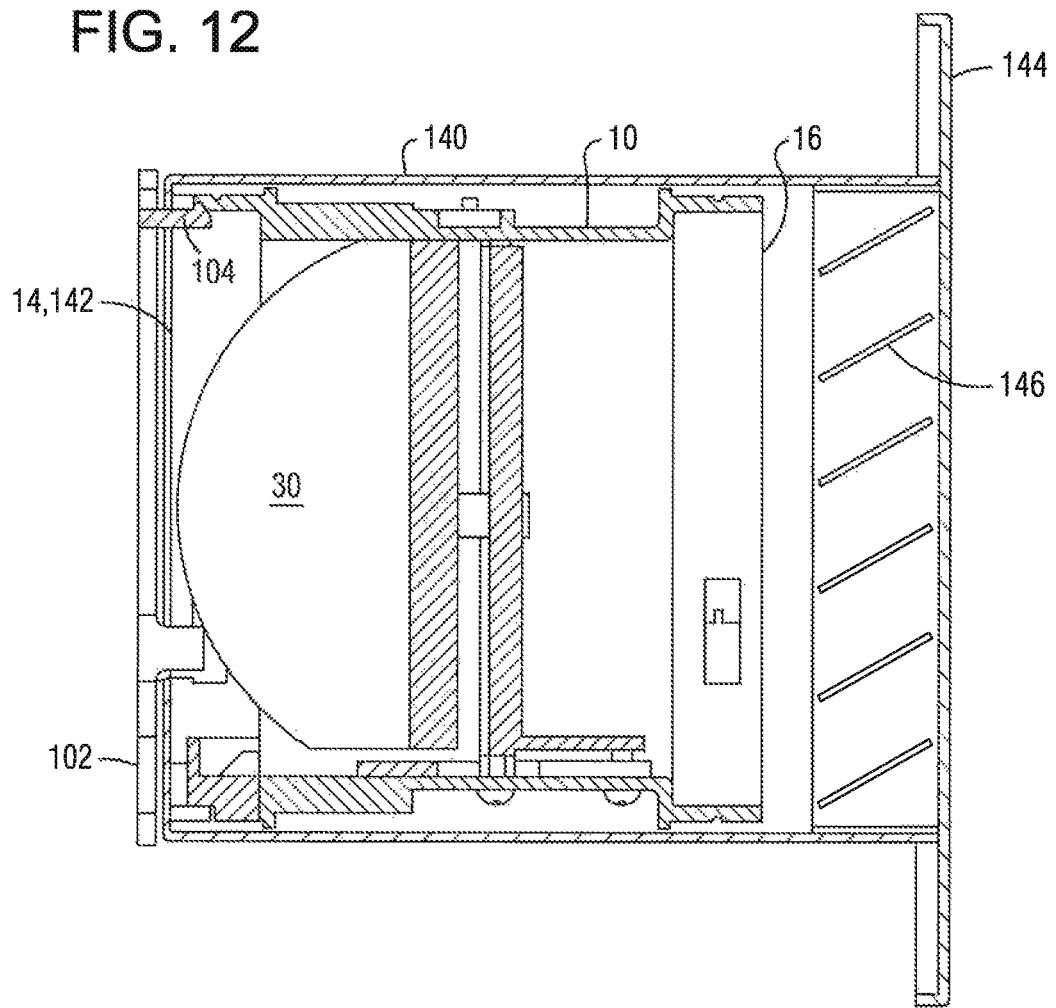

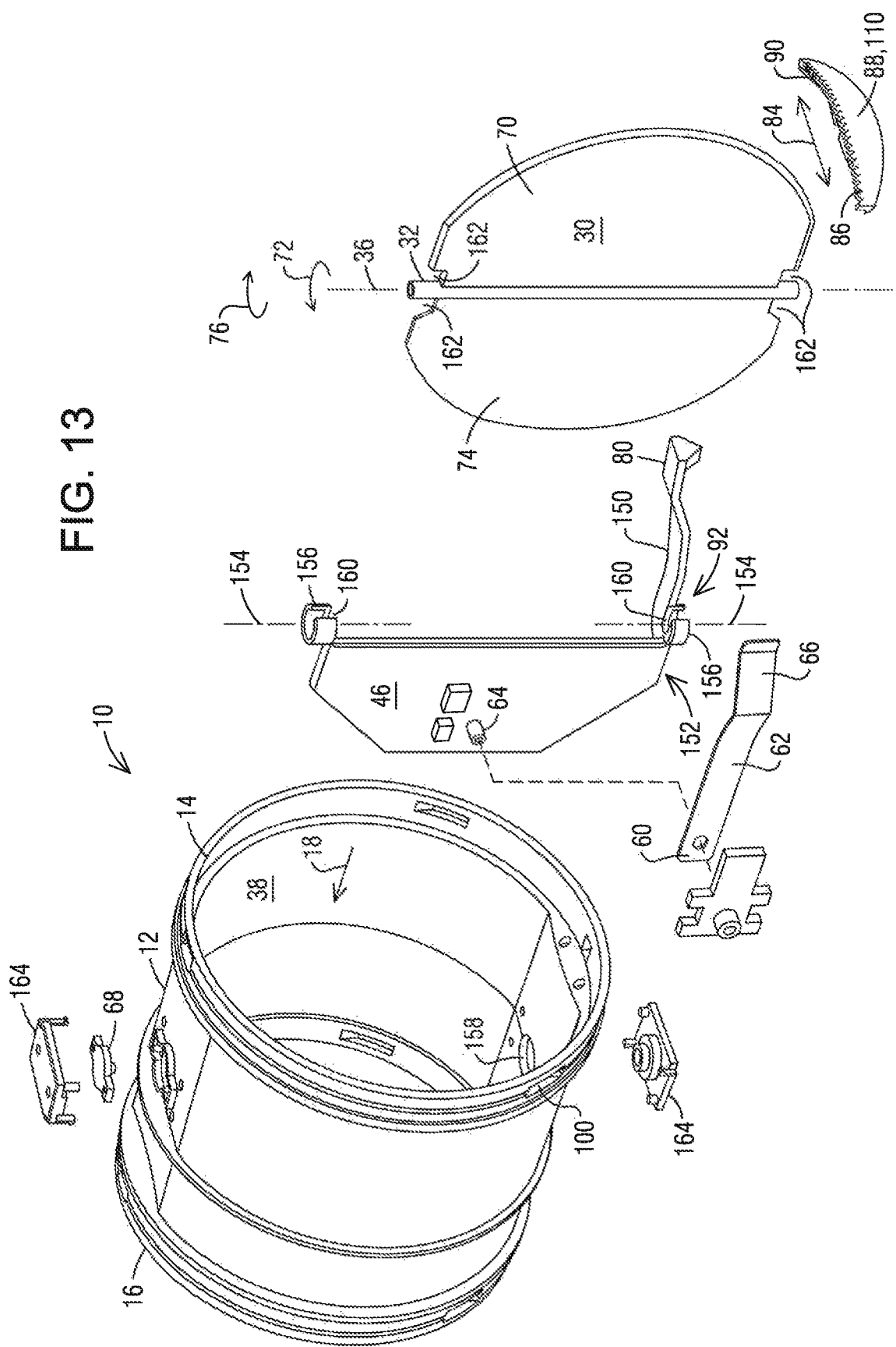

AIRFLOW BALANCING VALVE FOR HVAC SYSTEMS

CROSS-REFERENCE TO RELATED APPLICATIONS

This application is a continuation of U.S. application Ser. No. 14/635,317 filed Mar. 2, 2015, which application claims priority benefit to U.S. Provisional Application Ser. No. 61/947,569 filed Mar. 4, 2014. Application Ser. No. 14/653, 317 and No. 61/947,569, in their entireties, are incorporated by reference herein.

FIELD OF THE INVENTION

The present invention relates generally to valves for regulating airflow within structures, and more particularly to an automatic airflow balancing valve for HVAC Systems.

BACKGROUND OF THE INVENTION

One of the more difficult tasks in commercial structures such as an office building or hotel, for example, is to ensure that the central heating, ventilation, and air conditioning system (HVAC) have properly balanced airflows based on the needs of each space. This is typically accomplished by manually adjusted fixed dampers within the supply and exhaust ventilation systems that are located throughout the structure.

These conventional air regulation devices typically include an adjustment mechanism in order to allow a technician to manually set an airflow volume which can be allowed to pass through each device. Once installed throughout the building, the technician and/or engineer must then perform a complicated balancing procedure wherein each of the previously installed devices are manually adjusted in order to achieve the desired airflow and exhaust rate throughout the structure. This manual process of adjusting mechanical dampers is challenging to perform accurately and does not accommodate any changes in the duct pressure caused from stack/chimney effect, loading of dirt and dust on filters/grilles/ductwork, user interaction, closing of registers, wind, and other systematic issues. The manual balancing process is also a labor intensive process thereby functions to greatly increase the cost of deploying the conventional systems, owing to the high amount of labor required.

Accordingly, there remains a need for an automatic airflow balancing valve for HVAC systems that do not suffer from the drawbacks of the above noted devices.

BRIEF DESCRIPTION OF THE DRAWINGS

The invention is explained in the following description in view of the drawings that show:

FIG. 9 is a partial view along line D-D of FIG. 3 of an exemplary embodiment of a rearward end of the adjustment element.

FIG. 10 is a partial view along line E-E of FIG. 3 of an exemplary embodiment of the rearward end of the adjustment element.

FIG. 12 is a perspective view of the assembly of FIG. 11 in assembled form.

FIG. 13 is a perspective exploded view of an alternate exemplary embodiment of the automatic airflow balancing valve.

DETAILED DESCRIPTION OF THE INVENTION

Figure 1:
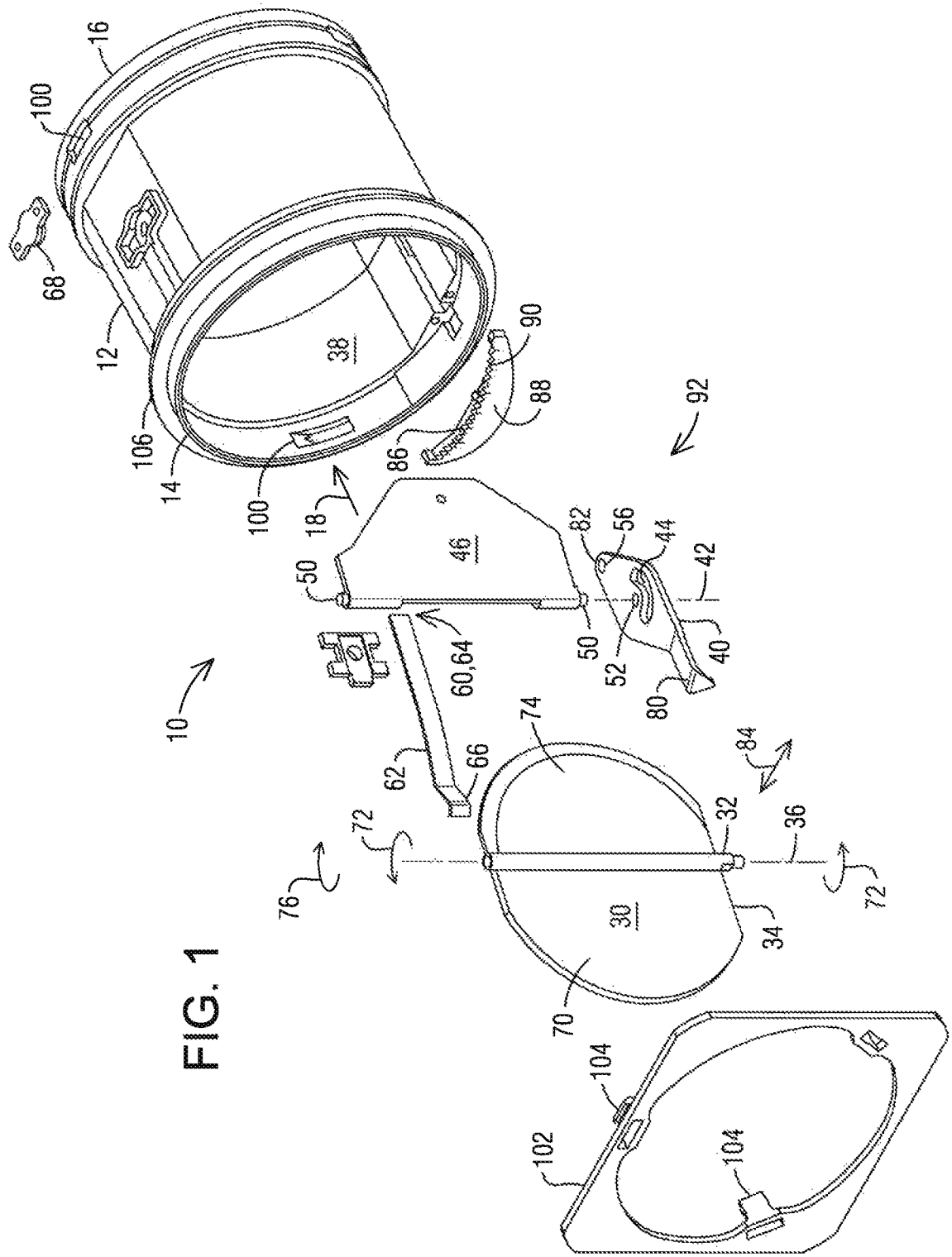
FIG. 1 is a perspective exploded view of an exemplary embodiment of the automatic airflow balancing valve.

An automatic airflow balancing valve for HVAC systems (device) and method for manufacturing/installing the same are described below with respect to the figures. As will be known to those of skill in the art, the below descriptions and illustrations are to provide but one means for performing the inventive concepts and are not to be limiting in any way as to system components or method steps.

In one exemplary embodiment, the automatic airflow balancing valve can include an adjustable airflow regulating device that automatically balances airflow in HVAC systems. As will be described below, various embodiments of the device can be passive in nature, and can be quickly and easily installed in supply and exhaust ventilation systems utilizing a four-way universal snap-in adapter plate or included rubber gasket for insertion in circular duct.

In an exemplary embodiment, the automatic airflow balancing valve can be constructed from Polypropylene material with a UL 94 listing with a V0 fire safety rating. Of course, any number of different materials that are suitable for use within HVAC environments can also be utilized herein. Several non-limiting examples include metal, composites and other types of polymeric materials. In another exemplary embodiment, the construction of one or more elements of the device can include an anti-microbial coating in order to impede the growth of bacterial organisms in the device. Such features providing enhanced safety and marketing possibilities or structure owners.

The device may include a control lever for adjusting the airflow set-point and a visual indicator that can be viewed by a technician without requiring removal of the device itself. For example, the device can be positioned relative to an air grille so as to allow the technician to identify the set-point of the airflow volume. Unlike the conventional airflow devices, which are sized specific to particular applications, the below described device can be universally adapted to field installations wherein a single device can be utilized in virtually any conventionally sized flow and/or return within an HVAC system. For example, the device can snap into an adapter plate and/or back-boxes by others for in-the-field installations in various configurations.

Conventional automatic airflow balancing ("AAB") valves require access to the outside of the housing to adjust the flow rate through the valve. For those AAB valves already installed, adjustment requires that the AAB valve be removed from its installed position, adjusted, and then re-installed. This costs time and money, particularly for fine tuning where several adjustments must be made. In response, the inventors have devised an innovative AAB valve having an adjustment mechanism that permits adjustment of the flow rate without requiring the technician to access the side of the housing. Instead, the technician can access the inventive adjustment mechanism when the AAB valve is installed through an end of the AAB valve. To further aid adjustment, certain exemplary embodiments may include visual indicators indicating more or less flow, and in certain exemplary embodiments the visual indicators may be calibrated to indicate an expected flow rate through the AAB valve.

Accordingly, once the technician accesses the inlet or outlet of the valve, adjustment to a desired flow rate is simply a matter of moving the adjustment element to the appropriate flow rate indicator. In an exemplary embodiment the AAB valve may further include a rotary damper to damp vibrations/oscillations. The damper may be pneumatic or hydraulic. An example rotary damper include the FRT series damper available from Bansbach Easylift® of North America, Inc. In an exemplary embodiment the AAB valve may include an adapter flange that may be installed and removed by hand, and that may adapt the AAB valve to non-circular installation openings.

FIG. 1 is an exploded view of an automatic airflow balancing ("AAB") valve 10 including a housing 12 having an inlet 14 and an outlet 16, the housing 12 defining a flow path 18 there through. Inside the housing 12 a valve disc 30 is secured to (or is one with) a valve disc shaft 32 that is, in turn, secured at both ends in the housing 12. In an exemplary embodiment the valve disc 30 and the valve disc shaft 32 are formed as one-piece and the valve disc shaft may have hollow ends to receive respective pins that define a valve disc axis 36 about which the valve disc shaft 32 and valve disc 30 pivot. Disposed between a bottom 34 of the valve disc 30 and an inside surface 38 of the housing is an adjustment element 40 that pivots about an adjustment element axis 42. The adjustment element 40 includes an adjustment element slot 44 to accommodate the valve disc shaft 32 (or, alternately, pins) that extends through the adjustment element 40 before reaching the housing 12. This permits the adjustment element 40 to pivot even though the relatively stationary valve disc shaft 32 extends through it.

Secured to the adjustment element 40 is an adjustment plate 46 having an adjustment plate shaft 50 (or, alternately, pins or functional equivalents thereof) that fits into an adjustment element hole 52. Accordingly, the adjustment element axis 42 of the adjustment plate 46 and the adjustment plate shaft 50 share the same axis of rotation. The adjustment plate 46 is secured also to the adjustment element 40 so that it does not pivot relative to the adjustment element 40. For example, the adjustment plate 46 may be secured to the adjustment element 40 at a fixing point 56 to prevent relative rotation. In an exemplary embodiment an adjustment plate arm (not visible) may be secured to the fixing point 56. In an exemplary embodiment the fixing may be via a fastener (e.g. a screw) or via a pin and hole arrangement etc.

A fixed end 60 of a spring 62 is secured to the adjustment plate 46 at a spring securing location 64. The spring 62 extends horizontally past the adjustment plate shaft 50, and when unrestrained may curve to the left (as seen in FIG. 1) along its length toward a free end 66. The valve disc axis 32 is secured directly adjacent the adjustment plate shaft 50, and therefore the spring 62 contacts a first portion 70 of the valve disc 30. This tends to bias the valve disc 30 in a counter clockwise direction 72 until a second portion 74 of the valve disc 30 abuts the adjustment plate 46. Accordingly, the spring 62 biases the valve disc 30 into a home position against the adjustment plate 46.

At least one damper 68 may be secured to the valve disc shaft 32 to reduce harmonic oscillations in the valve disc shaft 32. The damper 68 may include the pins (not shown) that fit into the hollow ends of the valve disc shaft 32 and which define the valve disc axis 36. As described above, the damper 68 may be a hydraulic rotary damper. Other damper styles and configurations known to those in the art may alternately be used.

The valve disc shaft 32 is not disposed in the exact middle of the valve disc 30, but is instead positioned slightly aft of the midpoint of the valve disc 30. As a result the first portion 70 of the valve disc 30 is slightly longer than the second portion 74, and therefore the first portion 70 presents more surface area to the higher pressure than does the second portion 74. With more surface area exposed to the higher pressure, when air is flowing the resulting force acting on the first portion 70 is greater than the force acting on the second portion 74, and this is effective to urge the valve disc 30 in the clockwise direction 76. The spring bias is selected to overcome the extra throe on the first portion 70 during normal operating conditions, thereby holding the spring 62 in the home position against the adjustment plate unless a force overcomes the bias of the spring 62. When an increase in the pressure difference (above the expected pressure difference) occurs and an associated extra force is applied to the first portion 70, the valve disc 30 will pivot in a clockwise direction 76 out of the home position due to the lever action of the first portion 70. Once the extra force ceases the spring 62 will urge the valve disc 30 back to the home position.

Conventionally, an increase in pressure across an airflow regulating valve would increase a flow rate through the airflow regulating valve. However, in the AAB valve 10 disclosed herein, the spring 62 is selected so that such increasing forces associated with increasing pressure differences overcome the spring bias. This pivots the valve disc 30 in the clockwise direction 76 in an amount proportional to the extra force. This rotation reduces a flow area through the AAB valve 10 proportional to the increase in force, and this, in turn, enables the AAB valve to maintain a constant flow rate despite varying pressure differentials.

The adjustment element 40 pivots about the adjustment element axis 42 in order to change a rotational position of the adjustment plate 46. Since the valve disc 30 is biased against the adjustment plate 46, the valve disc 30 pivots with the adjustment plate 46. Accordingly, adjusting the adjustment element 40 adjusts home position of the valve disc 30, and this adjusts the flow area through the AAB valve 10 associated with the respective home position (at a given pressure differential).

The adjustment element 40 may include a forward end 80 that extends toward the inlet 14, and a rearward end 82 that extends toward the outlet 16. Moving either of these in a lateral direction 84 pivots the adjustment element 40 about the adjustment element axis 42. There may be positioning elements 86 (e.g. detents or notches) associated with one or both ends of the adjustment element 40, and these may engage the respective end. In addition there may be visual indicators (not visible) on a display surface 88 and facing outward so a technician can read them while looking in the inlet 14 and/or the outlet 16. The visual indicators may be associated with respective positioning elements 86 and may indicate the flow rate through the AAB valve 10 for a respective home position of the valve disc 30. The visual indicators and/or the positioning elements may be positioned on a ridge 90. The adjustment element 40 and the adjustment plate 46 may collectively be referred to as an airflow volume calibrating assembly 92.

The AAB valve 10 may further include plate interlock features 100 at the inlet 14 and/or the outlet 16, configured to engage an interlocking adapter flange 102 via flange interlock features 104 that can be installed and removed using hands alone. The interlocking adapter flange 102 may be used to adapt the circular housing 12 to a non-circular installation. Non circular installation shapes include quadrilaterals such as squares and rectangles, as well as any other shape known to those in the art. In a non-limiting embodiment the interlocking adapter flange 102 can be configured into any rectangular openings greater than 2.9" w×2.9" h. However, other dimensions are also contemplated. The AAB valve 10 may further include a rubber gasket 106 that enables the AAB valve 10 to be readily inserted in an appropriate round collar or duct while providing an airtight seal around the AAB valve 10. The gasket 106 may add size to the overall outside diameter of the AAB valve 10, but compresses to fit within the appropriate collar or duct. Any or all of the components may be infused with an anti-microbial agent to prevent mold and bacteria from forming.

In the preferred embodiment, the automatic airflow balancing valve can be constructed from Polypropylene material with a UL 94 listing with a VO fire safety rating. Alternately, or in addition, any number of different materials that are suitable for use within HVAC environments can also be utilized herein. Several non-limiting examples include metal, composites and other types of polymeric materials. In another embodiment, the construction of one or more elements of the device can include an anti-microbial agent in order to impede organic growth in the device. Such features providing enhanced safety and marketing possibilities for structure owners. Although not limited to size or scale, in one preferred embodiment, the housing 12 is scalable from 3" to 120" nominal outer diameter.

Figure 2:
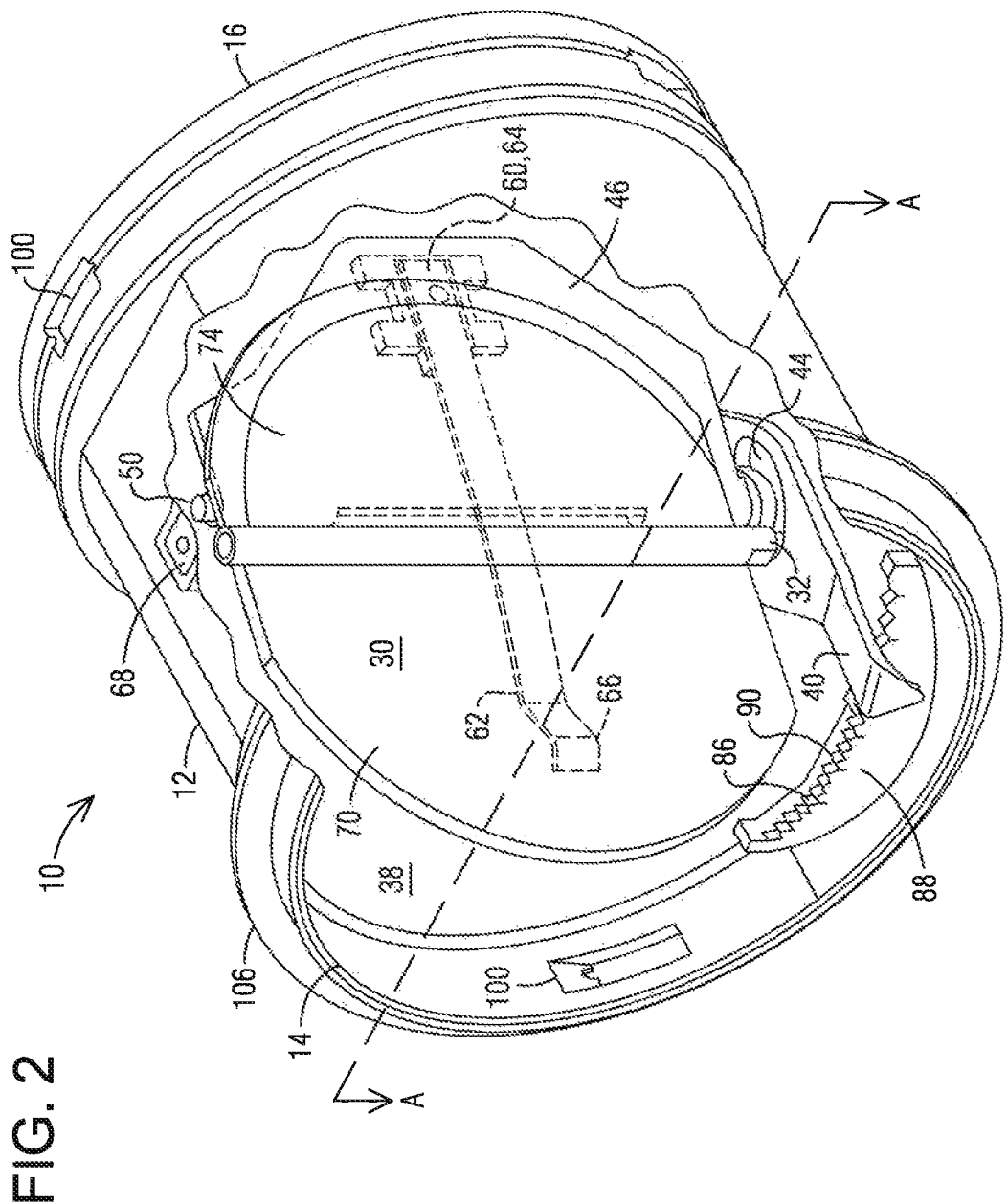
FIG. 2 is a perspective view of the automatic airflow balancing valve of FIG. 1 in assembled form with the housing partially cut away.

FIG. 2 is a perspective view showing the AAB valve 10 in an assembled form and with the housing 12 partially cut away. From this is can be readily seen that in this exemplary embodiment the airflow volume calibrating assembly 92 can be seen and accessible by hand from the inlet 14.

Figure 3:
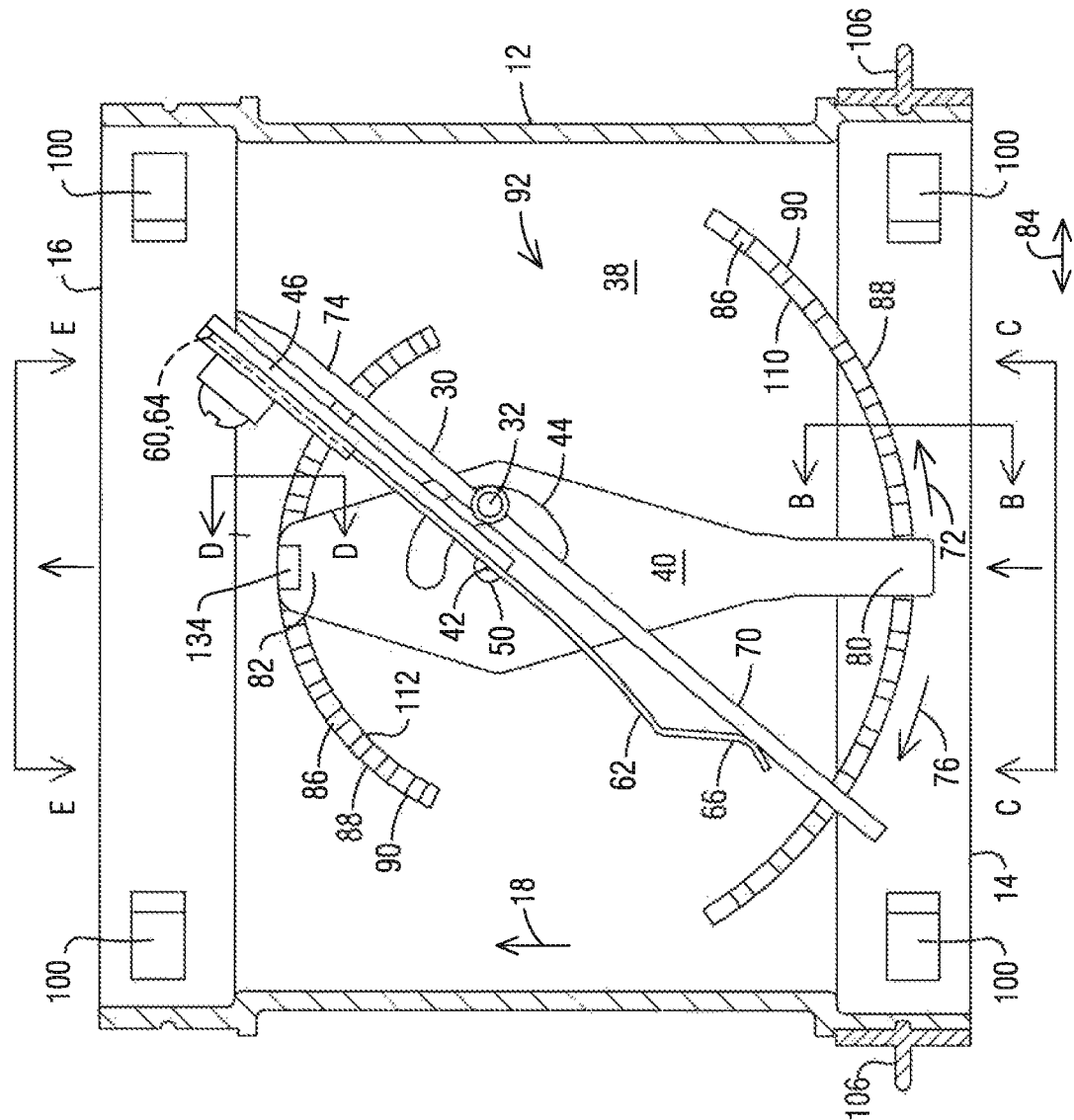
FIG. 3 is a cross section of an assembled automatic airflow valve along line A-A of FIG. 2 with the airflow volume calibrating assembly in a first position.

FIG. 3 is a cross sectional view of an assembled AAB valve 10 along A-A of FIG. 2 with the airflow volume calibrating assembly 92 in a first position having a slightly reduced flow area than is possible. Here it can be seen that a technician could simply reach into either the inlet 14 or the outlet 16 of the housing 12 to laterally move the forward end 80 or the rearward end 82 respectively, thereby adjusting the flow rate of the AAB valve 10. In an exemplary embodiment the positioning elements 86 (e.g. forward positioning elements) are disposed atop a forward ridge 110. The forward ridge 110 may be curved to match a radius of the forward arm 80. Alternately, the forward ridge 110 may take any shape, including straight, in which case the forward arm 80 would simply overhang the ridge forward 110 by varying amounts, depending on the lateral position of the forward arm 80. The visual indicators (not visible) may be on the display surface 88 so they can be readily seen by a technician looking into the inlet 14 of the housing 12.

In an exemplary embodiment there may be visual indicators (not visible) on a display surface 88 disposed toward the outlet 16 of the housing 12, which may or may not be disposed on a rearward ridge 112. There may or may not be positioning elements 86 on the rearward ridge 112, and the rearward ridge 112 may be curved or straight.

It can be seen that during operation an increased pressure drop across the valve disc 30, and the associate increase in force on the first portion 70 would pivot the valve disc 30 in the clockwise direction 76. Upon cessation of the extra force, the spring 62 would urge the valve disc 30 back into the home position shown.

Figure 4:
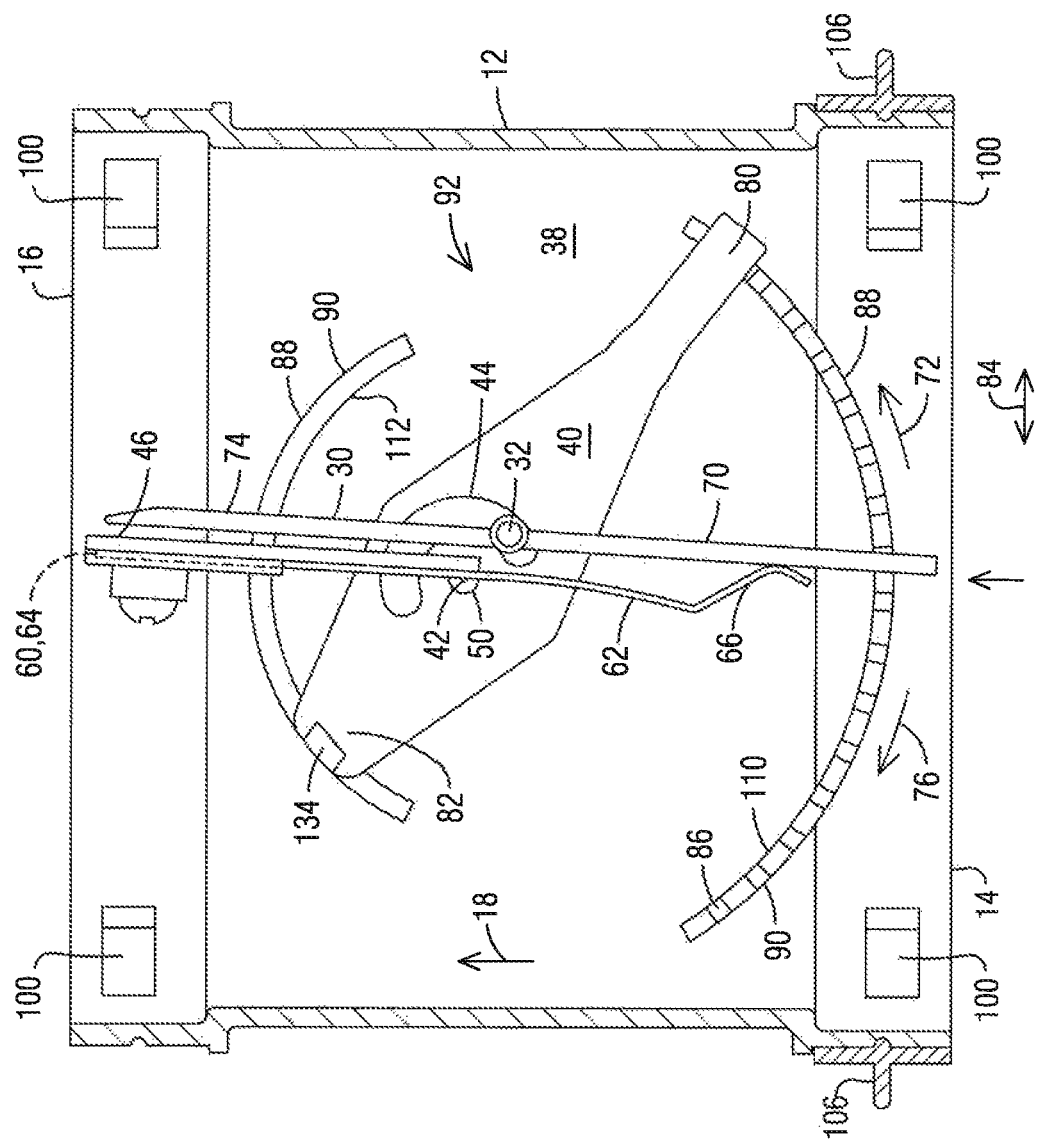
FIG. 4 is a cross section of an assembled automatic airflow valve along line A-A of FIG. 2 with the airflow volume calibrating assembly in a second position.

FIG. 4 is a cross sectional view of an assembled AAB valve 10 along A-A of FIG. 2 with the airflow volume calibrating assembly 92 in a first position having a maximum flow area. The same principles that apply to the function of the AAB valve 10 when the airflow volume calibrating assembly 92 is in the first position apply when the airflow volume calibrating assembly 92 is in the second position.

Figure 5:
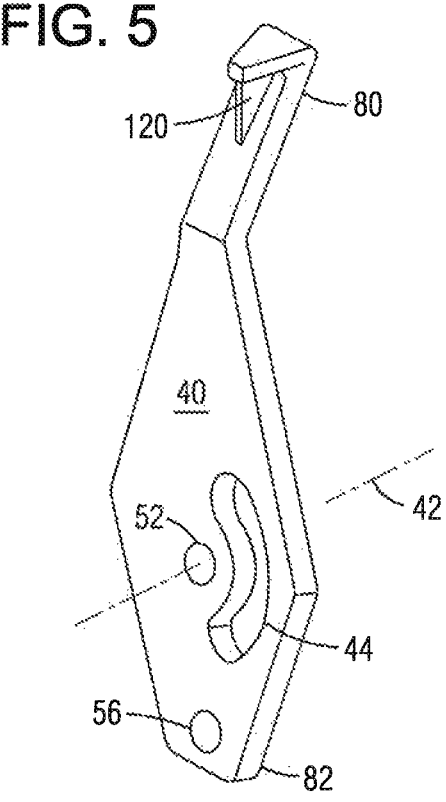
FIG. 5 is a perspective view of an exemplary embodiment of the adjustment element.
Figure 6:
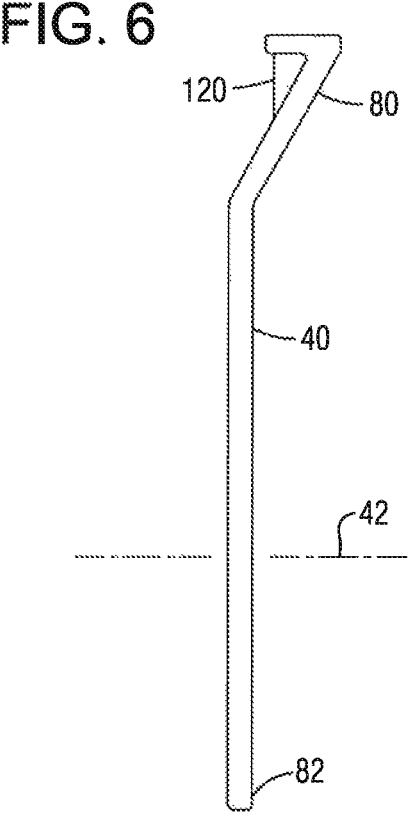
FIG. 6 is a side view of the adjustment element of FIG. 5.

FIG. 5 is a perspective view of the adjustment element showing the forward end 80, the rearward end 82, the adjustment element slot 44, and the adjustment element hole 52 that defines the adjustment element axis 42. Also visible in this exemplary embodiment is an engaging portion 120 configured to engage the positioning elements 86. FIG. 6 is a side view of the adjustment element 40 also showing the engaging portion 120.

Figure 7:
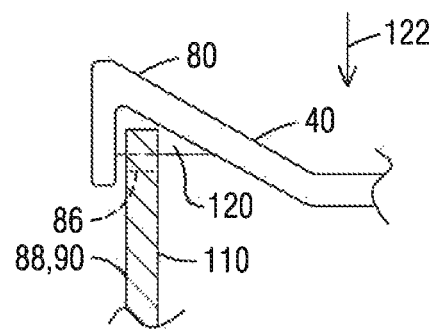
FIG. 7 is a partial view along line B-B of FIG. 3 of an exemplary embodiment of a forward end of an adjustment element.
Figure 8:
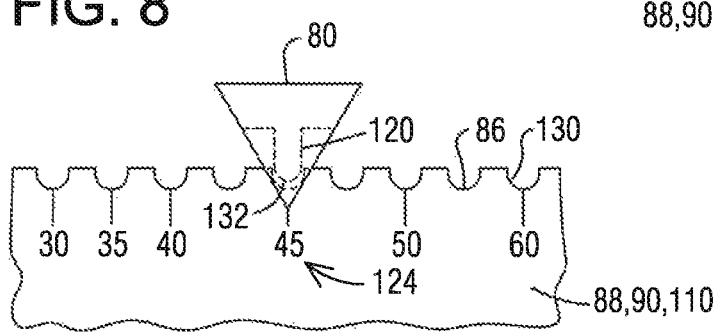
FIG. 8 is a partial view along line C-C of FIG. 3 of an exemplary embodiment of the forward end of the adjustment element.

FIG. 7 is a partial side view along B-B of FIG. 3 showing the engaging portion 120 of the forward end 80 resting in a positioning element 86 which may be, for example, a notch in the forward ridge 110. The forward end 80 may be resilient and the resiliency may bias the forward end 80 in a downward direction 122. In such a configuration the engaging portion 120 rests firmly in the notch and resist lateral motion, which is effective to hold the airflow volume calibrating assembly 92 in place.

FIG. 5 is a partial view along line C-C of FIG. 3 showing the positioning elements 86 embodied as a plurality of notches, and the engaging portion 120 of the forward end 80 resting in a selected notch. Visual indicators 124 may be disposed on the display surface 88. The visual indicators 124 may be associated with respective positioning elements 86 and may indicate a flow rate (e.g. cubic feet per minute "CFM") expected through the AAB valve 10 when the forward end 80 is associated with (resting in) the respective positioning element 86. Sides 130 of the positioning elements 86 may be ramped, and sides 132 of the engaging portion 120 of the forward end 80 may also be ramped and a resilience of the forward end may be selected so they are effective to hold the airflow volume calibrating assembly 92 in place during operation, but which allow the forward end 80 to lift sufficiently enough to move laterally when a latterly force is applied to the forward end or to the rearward end 82.

FIG. 9 is a partial side view along D-D of FIG. 2 showing the rearward end 82 of the adjusting element 40, the rearward ridge 112, and the display surface 88. Also visible is a rear push tab 134. A technician may apply lateral force to the rearward end 82 and/or the optional rear push tab 134 to pivot the airflow volume calibrating assembly 92. If the forward end 80 engages the positioning elements 86, then the lateral force simply needs to be sufficient to overcome the bias of the forward end 80 into the positioning elements 86. If the forward end 80 does not engage the positioning elements 86 (e.g. there are no positioning elements), then less lateral force on the rearward end 82 may be needed.

FIG. 10 is a partial view along line E-E of FIG. 3 showing the rearward end 82 of the adjusting element 40 including an optional pointer 136 pointing to visual indicators 124 which may indicate an expected flow rates through the AAB valve 10.

Figure 11:
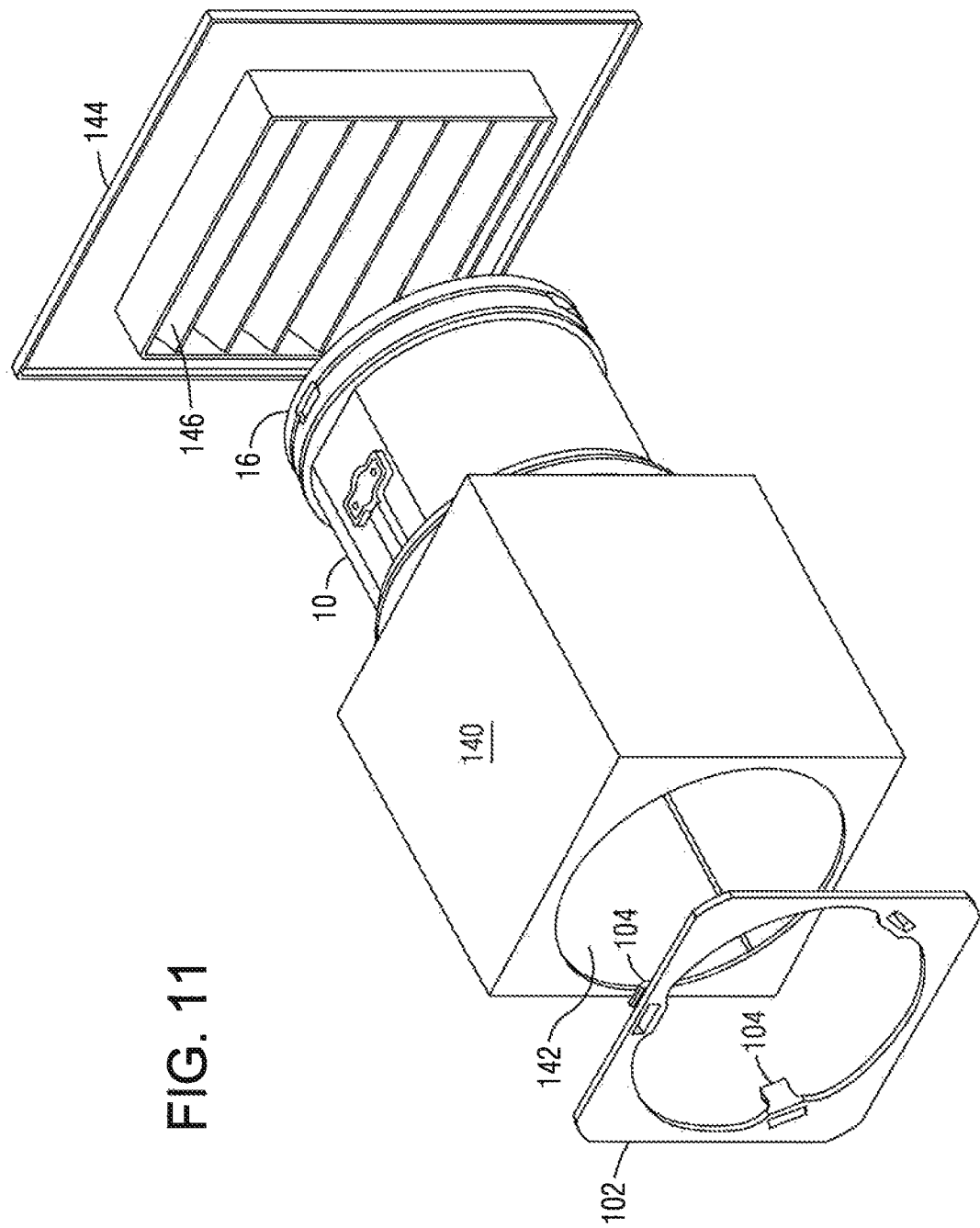
FIG. 11 is a perspective exploded view of a ventilation assembly including the automatic airflow balancing valve of FIG. 1.

FIG. 11 is an exploded perspective view of a ventilation assembly 138 including the AAB valve 10 which is to be positioned inside a vent box 140 having a square shape. The AAB valve 10 may be secured to the vent box 140 via the flange interlock features 104 of the interlocking adapter flange 102 such that the inlet 14 of the AAB valve 10 is associated with an inlet 142 of the vent box 140. The outlet 16 of the AAB valve 10 is associated with a vent cover 144 optionally having vent flaps 146. FIG. 12 shows the arrangement of FIG. 11 in an assembled form.

FIG. 13 is a perspective exploded view of an alternate exemplary embodiment of the AAB valve 10. Many components remain the same as in the exemplary embodiment of FIG. 1. However, in this exemplary embodiment the adjustment element 150 is formed as one with the adjustment plate 46 and the unified adjustment assembly 152 pivots about a common axis of rotation 154 via cylindrical ends 156 that pivot within cylindrical receptacles 158 in the housing 12. Innovatively, shaft openings 160 in the cylindrical ends 156 are configured to receive the valve disc shaft 32 such that the valve disc axis 36 and the common axis of rotation 154 coincide with each other. Accordingly, moving the forward end 80 of the unified adjustment assembly 152 pivots the adjustment plate 46 about the common axis of rotation 154, which, in turn, pivots the valve disc 30 about the common axis of rotation 154 as aided by the spring 62.

There may be one or more relief cuts 162 in the valve disc 30 to prevent interference when the components pivot. Alternately, or in addition, the cylindrical ends 156 may be secured in the cylindrical receptacles 158 by one or more centering elements 164 that may snap into the housing 12 to hold the components in place. Optionally, the damper 68 may be sandwiched between one of the centering elements 164 and the housing 12. Accordingly, in this exemplary embodiment, to remove the unified adjustment assembly 152 and the valve disc 30 one would simply need to remove the centering elements 164 and slide the unified adjustment assembly 152 and the valve disc 30 out of the housing 12.

Alternately, or in addition, the adjustment element 150 could include a rearward end (not shown) that extends toward the outlet 16. In an exemplary embodiment the valve disc shaft 32 may simply snap into the shaft openings 160, and these may likewise snap into the cylindrical receptacles 158.

Figure 14:
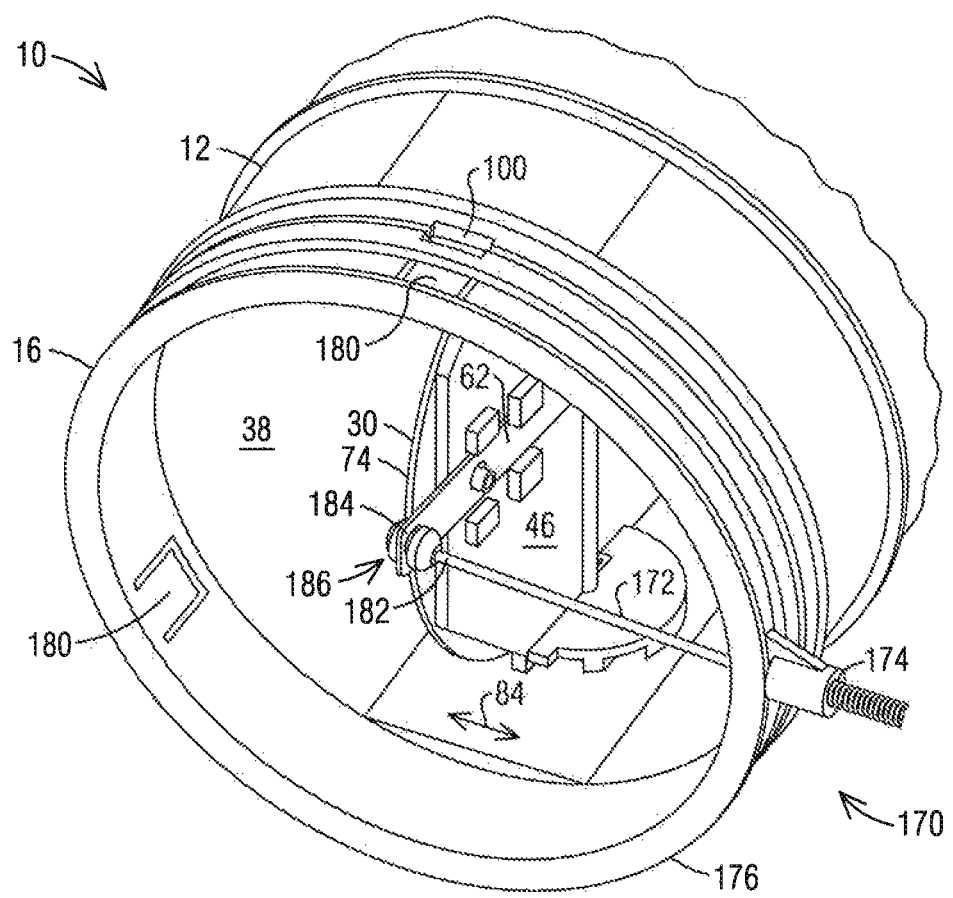
FIG. 14 is a perspective view of an exemplary embodiment of a cable adjustment arrangement.

FIG. 14 is a perspective view of the AAB valve 10 having an exemplary embodiment of a cable adjustment arrangement 170 positioned at the outlet 16. The cable adjustment arrangement 170 includes a cable 172 extending through a cable aperture 174 in a cable adapter ring 176. The cable adapter ring 176 is secured to the housing 12 via ring interlocking features 180 that engage the plate interlock features 100 to hold the cable adapter ring 176 in place. A valve end 182 of the cable 172 is connected to the airflow volume calibrating assembly 92. In this non limiting exemplary embodiment the spring 62 includes a cable extension 184 configured to connect to the cable 172. Accordingly, movement of the cable in the lateral direction 84 pivots the adjustment plate 46 and this, in turn, pivots the valve disc 30. The cable 172 may be selected to be flexible enough to bend to accommodate the arcuate motion of the cable extension 184. Alternately, or in addition, a cable connection 186 may have freedom to accommodate relative motion between the cable extension 184 and the valve end 182 of the cable 176. The cable adapter ring 176 surrounding the cable aperture 174 may be structurally reinforced to manage forces created by the arcuate motion of the cable extension 184. The cable adjustment arrangement 170 may exist in addition to the adjustment element 40, or the adjustment element 40 may be dispensed with when the cable adjustment arrangement 170 is used. The cable 176 may be secured to the adjustment element 40, or any other element so long as the movement of the cable 176 produces the desire pivoting of the airflow volume calibrating assembly 92.

Figure 15:
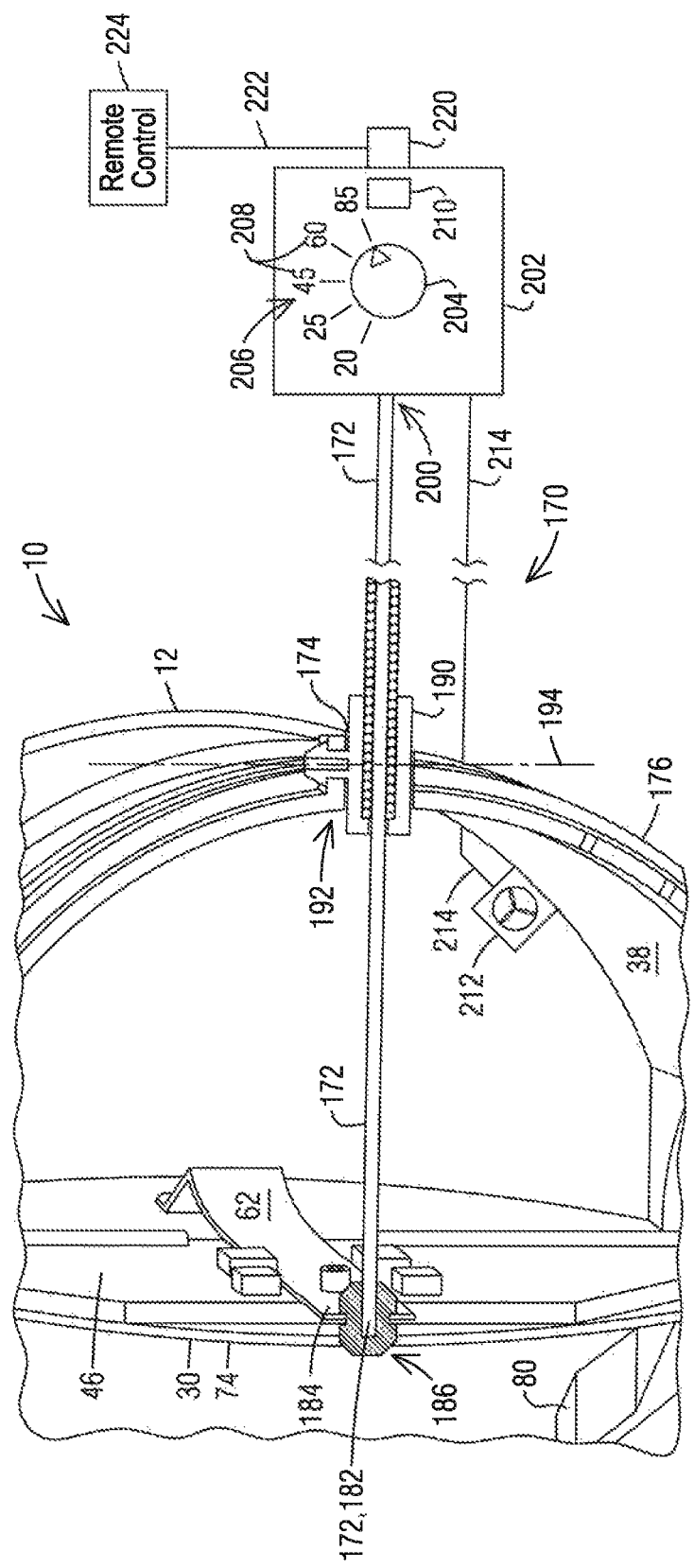
FIG. 15 is a sectional view of an alternate exemplary embodiment of the cable adjustment arrangement of FIG. 14.

FIG. 15 is a sectional view of an alternate exemplary embodiment of the cable adjustment arrangement 170. The cable aperture 174 in this exemplary embodiment is large enough to accommodate a cable insert 190 that may connect to the cable adapter ring 176 via a snap-in arrangement 192. The snap-in arrangement 192 may be able to pivot about a snap-in arrangement axis 194 to accommodate the arcuate motion of the cable extension 184, and hence the arcuate motion of the valve end 182 of the cable 176.

A control end 200 of the cable 176 may be operatively connected to a controller 202 that permits manual or automatic or control of the flow rate setting of the AAB valve 10. The controller 202 may include a manual input 204 and a display 206. The display 206 may have display indicators 208 that may be calibrated so that the indicators 208 indicate the flow rate through the AAB valve 10 associated with the position selected for the manual input 204. When the manual input 204 shown is rotary as shown, there may be gears (not shown) that convert the rotary motion of the manual input 204 to linear motion for the cable 176. Alternately, the cable 176 may be directly connected to the manual input 204 and the cable may either flex to accommodate arcuate motion of the manual input 204 and/or the connection may provide relative movement to accommodate the arcuate motion. In another exemplary embodiment the manual input 204 may be linear.

Alternately or in addition the controller 202 may include an actuator 210 that may move the cable 176. Such an actuator may be a motor, or linear actuator, etc. and may be powered by battery, or a remote power source such as a source of alternating or direct current. One source of current may be a micro turbine 212 disposed in the flow path 18. The micro turbine can provide direct power to the actuator via a power line 214 when there is a flow through the AAB valve 10. When used in conjunction with a battery the micro turbine could be a constant source of energy.

The controller 200 may also be remotely operable and/or programmable via a processor 220 that may be in remote communication via a communication path 222 with a remote control 224. The communication path 222 may be wired or wireless and may permit remote calibration and/or operation of the AAB valve 10. The processor 220 may receive and transmit information and may control the actuator 210 as instructed. Such an arrangement would enable simultaneous and ongoing control of all of the AAB valves 10 in an installation from one or more remote locations. This, in turn, would allow for individual adjustment of each of a plurality of AAB valves 10 as necessary to accommodate transient changes and/or more long term changes such as seasonal changes.

From the foregoing it can be seen that the AAB valve 10 disclosed herein can be adjusted in-situ and from the inlet 14, the outlet 16, or both. This eliminates the need to remove the AAB valve 10 to make adjustments, which represents time and cost savings. Consequently, this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. An automatic airflow balancing valve comprising:
   a housing comprising an inlet and an outlet and defining a flow path from the inlet to the outlet;
   an adjustment plate located in the flow path and configured to rotate about an adjustment plate axis, wherein the adjustment plate is further configured to be set in any of multiple rotational positions about the adjustment plate axis, and wherein the adjustment plate extends from the adjustment plate axis toward the outlet;
   a valve disc located in the flow path and configured to rotate, separately from the adjustment plate, about a valve disc axis, wherein the valve disc comprises a first portion extending from the valve disc axis toward the inlet and a second portion extending from the valve disc axis toward the outlet; and
   a spring biasing the valve disc into a home position against the adjustment plate,
   wherein the valve disc, the adjustment plate, and the spring are configured so that, when the adjustment plate is set in a rotational position corresponding to a desired airflow level, an increased pressure difference between the inlet and the outlet creates a force on the valve disc to overcome a biasing force of the spring and to rotate the valve disc to a position reducing flow area in the flow path.

2. The automatic airflow balancing valve of claim 1, wherein an area of the first portion is greater than an area of the second portion.

3. The automatic airflow balancing valve of claim 1, further comprising:
   a lever fixed to the adjustment plate and laterally movable to rotate the adjustment plate; and
   a plurality of stops configured to hold the lever in unique lateral positions.

4. The automatic airflow balancing valve of claim 1, wherein the valve disc axis coincides with the adjustment plate axis.

5. The automatic airflow balancing valve of claim 1, wherein the housing comprises receptacles, and further comprising:
   fittings fixed to the adjustment plate, wherein the fittings surround the adjustment plate axis and are rotatable within the receptacles; and
   shaft ends fixed to the valve disc and coinciding with the valve disc axis, wherein the shaft ends are rotatable within the fittings.

6. The automatic airflow balancing valve of claim 5, wherein the fittings comprise openings configured to receive the shaft ends.

7. The automatic airflow balancing valve of claim 1, wherein the spring comprises a fixed end secured to the adjustment plate and a free end that contacts the first portion of the valve disc, and wherein the spring extends across the adjustment plate axis and the valve disc axis.

8. The automatic airflow balancing valve of claim 1, further comprising:
   shaft ends fixed to the valve disc and coinciding with the valve disc axis, wherein the shaft ends, the first portion, and the second portion are fixed relative to one another.

9. The automatic airflow balancing valve of claim 1, further comprising:
   shaft ends fixed to the valve disc and coinciding with the valve disc axis, wherein the shaft ends, the first portion, and the second portion are formed as a single piece.

10. An automatic airflow balancing valve comprising:
    a housing comprising receptacles, an inlet, and an outlet, wherein the housing defines a flow path from the inlet to the outlet;
    an adjustment plate located in the flow path and configured to be set in any of multiple rotational positions;
    fittings fixed to the adjustment plate, wherein the fittings are rotatable within the receptacles, and wherein the adjustment plate extends from the fittings toward the outlet;
    a valve disc located in the flow path; and
    shaft ends fixed to the valve disc, wherein the shaft ends are rotatable within the fittings, wherein the valve disc comprises a first portion extending from the shaft ends toward the inlet and a second portion extending from the shaft ends toward the outlet, and wherein the valve disc is biased against the adjustment plate.

11. The automatic airflow balancing valve of claim 10, further comprising a spring biasing the valve disc against the adjustment plate.

12. The automatic airflow balancing valve of claim 11, wherein the spring comprises a first end contacting the adjustment plate and a second end contacting the valve disc.

13. The automatic airflow balancing valve of claim 10, further comprising:
    a lever fixed to the adjustment plate and laterally movable to rotate the adjustment plate; and
    a plurality of stops configured to hold the lever in unique lateral positions.

14. The automatic airflow balancing valve of claim 13, further comprising a spring, wherein the spring comprises a fixed end secured to the adjustment plate and a free end that contacts the first portion of the valve disc.

15. The automatic airflow balancing valve of claim 10, wherein an area of the first portion is greater than an area of the second portion.

16. The automatic airflow balancing valve of claim 10, wherein the fittings comprise openings configured to receive the shaft ends.

17. The automatic airflow balancing valve of claim 10, wherein the first portion and the second portion are fixed relative to one another.

18. The automatic airflow balancing valve of claim 10, wherein the shaft ends, the first portion, and the second portion are formed as a single piece.

19. The automatic airflow balancing valve of claim 10, further comprising a cable coupled to the adjustment plate and extending through the housing.

20. An automatic airflow balancing valve comprising:
    a housing comprising an inlet and an outlet and defining a flow path from the inlet to the outlet;
    an adjustment plate located in the flow path and configured to rotate about an adjustment plate axis, wherein the adjustment plate is further configured to be set in any of multiple rotational positions about the adjustment plate axis, and wherein the adjustment plate extends from the adjustment plate axis toward the outlet;
a valve disc located in the flow path and configured to rotate, separately from the adjustment plate, about a valve disc axis, wherein the valve disc comprises a first portion extending from the valve disc axis toward the inlet and a second portion extending from the valve disc axis toward the outlet, and wherein an area of the first portion is greater than an area of the second portion; and
a spring biasing the valve disc into a home position against the adjustment plate.

21. The automatic airflow balancing valve of claim 20, further comprising:
a lever fixed to the adjustment plate and laterally movable to rotate the adjustment plate; and
a plurality of stops configured to hold the lever in unique lateral positions.

22. The automatic airflow balancing valve of claim 20, wherein the valve disc axis coincides with the adjustment plate axis.

23. The automatic airflow balancing valve of claim 20, wherein the spring comprises a fixed end secured to the adjustment plate and a free end that contacts the first portion of the valve disc, and wherein the spring extends across the adjustment plate axis and the valve disc axis.

24. The automatic airflow balancing valve of claim 20, further comprising:
shaft ends fixed to the valve disc and coinciding with the valve disc axis, wherein the shaft ends, the first portion, and the second portion are fixed relative to one another.

25. An automatic airflow balancing valve comprising:
a housing comprising an inlet and an outlet and defining a flow path from the inlet to the outlet;
an adjustment plate located in the flow path and configured to rotate about an adjustment plate axis, wherein the adjustment plate is further configured to be set in any of multiple rotational positions about the adjustment plate axis, and wherein the adjustment plate extends from the adjustment plate axis toward the outlet;
a valve disc located in the flow path and configured to rotate, separately from the adjustment plate, about a valve disc axis, wherein the valve disc comprises a first portion extending from the valve disc axis toward the inlet and a second portion extending from the valve disc axis toward the outlet;
a spring biasing the valve disc into a home position against the adjustment plate;
a lever fixed to the adjustment plate and laterally movable to rotate the adjustment plate; and
a plurality of stops configured to hold the lever in unique lateral positions.

26. The automatic airflow balancing valve of claim 25, wherein the valve disc axis coincides with the adjustment plate axis.

27. The automatic airflow balancing valve of claim 25, wherein the spring comprises a fixed end secured to the adjustment plate and a free end that contacts the first portion of the valve disc, and wherein the spring extends across the adjustment plate axis and the valve disc axis.

28. An automatic airflow balancing valve comprising:
a housing comprising an inlet and an outlet and defining a flow path from the inlet to the outlet;
an adjustment plate located in the flow path and configured to rotate about an adjustment plate axis, wherein the adjustment plate is further configured to be set in any of multiple rotational positions about the adjustment plate axis, and wherein the adjustment plate extends from the adjustment plate axis toward the outlet;
a valve disc located in the flow path and configured to rotate, separately from the adjustment plate, about a valve disc axis, wherein the valve disc comprises a first portion extending from the valve disc axis toward the inlet and a second portion extending from the valve disc axis toward the outlet, and wherein the valve disc axis coincides with the adjustment plate axis; and
a spring biasing the valve disc into a home position against the adjustment plate.

29. The automatic airflow balancing valve of claim 28, wherein the spring comprises a fixed end secured to the adjustment plate and a free end that contacts the first portion of the valve disc, and wherein the spring extends across the adjustment plate axis and the valve disc axis.

30. The automatic airflow balancing valve of claim 28, further comprising:
shaft ends fixed to the valve disc and coinciding with the valve disc axis, wherein the shaft ends, the first portion, and the second portion are fixed relative to one another.

31. An automatic airflow balancing valve comprising:
a housing comprising an inlet and an outlet and defining a flow path from the inlet to the outlet;
an adjustment plate located in the flow path and configured to rotate about an adjustment plate axis, wherein the adjustment plate is further configured to be set in any of multiple rotational positions about the adjustment plate axis, and wherein the adjustment plate extends from the adjustment plate axis toward the outlet;
a valve disc located in the flow path and configured to rotate, separately from the adjustment plate, about a valve disc axis, wherein the valve disc comprises a first portion extending from the valve disc axis toward the inlet and a second portion extending from the valve disc axis toward the outlet; and
a spring biasing the valve disc into a home position against the adjustment plate, wherein the spring comprises a fixed end secured to the adjustment plate and a free end that contacts the first portion of the valve disc, and wherein the spring extends across the adjustment plate axis and the valve disc axis.

32. The automatic airflow balancing valve of claim 31, further comprising:
shaft ends fixed to the valve disc and coinciding with the valve disc axis, wherein the shaft ends, the first portion, and the second portion are fixed relative to one another.

33. The automatic airflow balancing valve of claim 32, wherein an area of the first portion is greater than an area of the second portion.

34. An automatic airflow balancing valve comprising:
a housing comprising an inlet and an outlet and defining a flow path from the inlet to the outlet;
an adjustment plate located in the flow path and configured to rotate about an adjustment plate axis, wherein the adjustment plate is further configured to be set in any of multiple rotational positions about the adjustment plate axis, and wherein the adjustment plate extends from the adjustment plate axis toward the outlet;
a valve disc located in the flow path and configured to rotate, separately from the adjustment plate, about a valve disc axis, wherein the valve disc comprises a first portion extending from the valve disc axis toward the inlet and a second portion extending from the valve disc axis toward the outlet;

a spring biasing the valve disc into a home position against the adjustment plate; and shaft ends fixed to the valve disc and coinciding with the valve disc axis, wherein the shaft ends, the first portion, and the second portion are fixed relative to one another.

35. The automatic airflow balancing valve of claim 34, further comprising:

a lever fixed to the adjustment plate and laterally movable to rotate the adjustment plate; and a plurality of stops configured to hold the lever in unique lateral positions.

36. The automatic airflow balancing valve of claim 34, wherein an area of the first portion is greater than an area of the second portion, and wherein the valve disc axis coincides with the adjustment plate axis.

* * * * *